(12) United States Patent
Oizumi

(10) Patent No.: US 7,302,470 B2
(45) Date of Patent: Nov. 27, 2007

(54) METHOD AND APPARATUS FOR CONFIRMING BEFORE SENDING AN E-MAIL ATTACHED WITH IMAGE DATA

(75) Inventor: Noritaka Oizumi, Tokyo (JP)

(73) Assignee: NEC Corporation, Tokyo (JP)

( * ) Notice: Subject to any disclaimer, the term of this patent is extended or adjusted under 35 U.S.C. 154(b) by 818 days.

(21) Appl. No.: 10/106,028

(22) Filed: Mar. 27, 2002

(65) Prior Publication Data

US 2002/0147846 A1 Oct. 10, 2002

(30) Foreign Application Priority Data

Mar. 29, 2001 (JP) .............................. 2001-095495

(51) Int. Cl.
*G06F 15/16* (2006.01)
(52) U.S. Cl. ....................... 709/206; 709/245; 358/402
(58) Field of Classification Search ................ 709/206, 709/245, 246; 370/351; 358/403, 402; 713/182
See application file for complete search history.

(56) References Cited

U.S. PATENT DOCUMENTS

| | | | | |
|---|---|---|---|---|
| 5,384,785 A * | 1/1995 | Yoda | ........................... | 714/746 |
| 6,363,414 B1 * | 3/2002 | Nicholls et al. | ............. | 709/206 |
| 6,412,014 B1 * | 6/2002 | Ryan | ........................... | 709/245 |
| 6,801,340 B1 * | 10/2004 | Endo | ........................... | 358/403 |
| 6,985,242 B1 * | 1/2006 | Toyoda | ........................ | 358/1.15 |
| 2001/0047391 A1 * | 11/2001 | Szutu | ............................ | 709/206 |
| 2001/0054152 A1 * | 12/2001 | Nakao et al. | ................ | 713/182 |
| 2002/0042815 A1 * | 4/2002 | Salzfass et al. | ............. | 709/206 |
| 2002/0063882 A1 * | 5/2002 | Sekiguchi | ................... | 358/1.15 |
| 2002/0065891 A1 * | 5/2002 | Malik | ........................... | 709/206 |
| 2002/0087647 A1 * | 7/2002 | Quine et al. | ................. | 709/206 |
| 2002/0133625 A1 * | 9/2002 | Hall et al. | .................... | 709/245 |
| 2002/0141380 A1 * | 10/2002 | Koguchi | ...................... | 370/351 |
| 2003/0088704 A1 * | 5/2003 | Mertama et al. | ............ | 709/246 |
| 2005/0198176 A1 * | 9/2005 | Landesmann | ............... | 709/206 |

FOREIGN PATENT DOCUMENTS

JP 2000-236413 A 8/2000

* cited by examiner

*Primary Examiner*—Andrew Caldwell
*Assistant Examiner*—Hai V. Nguyen
(74) *Attorney, Agent, or Firm*—Sughrue Mion Pllc.

(57) ABSTRACT

A communication apparatus allowing confirmation of e-mail address before sending and allowing the load on the network to be reduced is disclosed. An e-mail address database is provided for retrievably storing a history of sending results for respective destination e-mail addresses. A controller searches the e-mail address database to find at least one e-mail address that has a domain name identical to that of the destination e-mail address and has a normal sending result. When the at least one e-mail address is found in the e-mail address database, the controller sends an e-mail attached with the image data to the destination e-mail address.

15 Claims, 7 Drawing Sheets

| 701 | 702 | 703 |
|---|---|---|
| E-MAIL ADDRESS | E-MAIL SENDING RESULT FLAG | DOMAIN SENDING RESULT FLAG |
| user1@abc.co.jp | TRUE | TRUE |
| user2@def.co.jp | FALSE | FALSE |
| user3@abc.co.jp | FALSE | TRUE |
FIG. 7
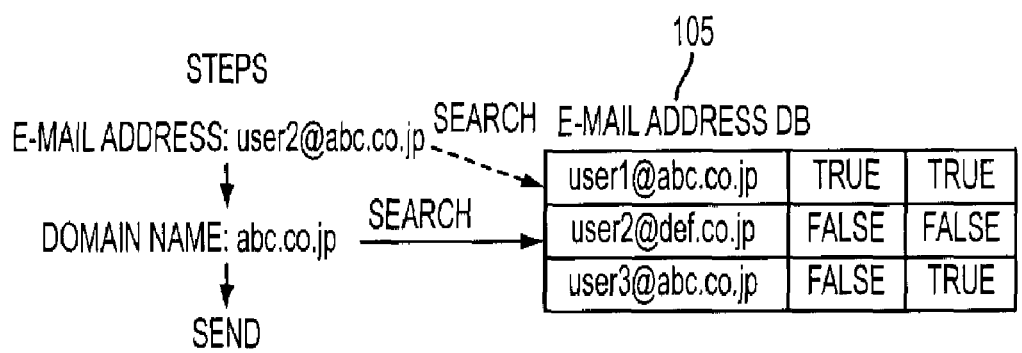
FIG. 8
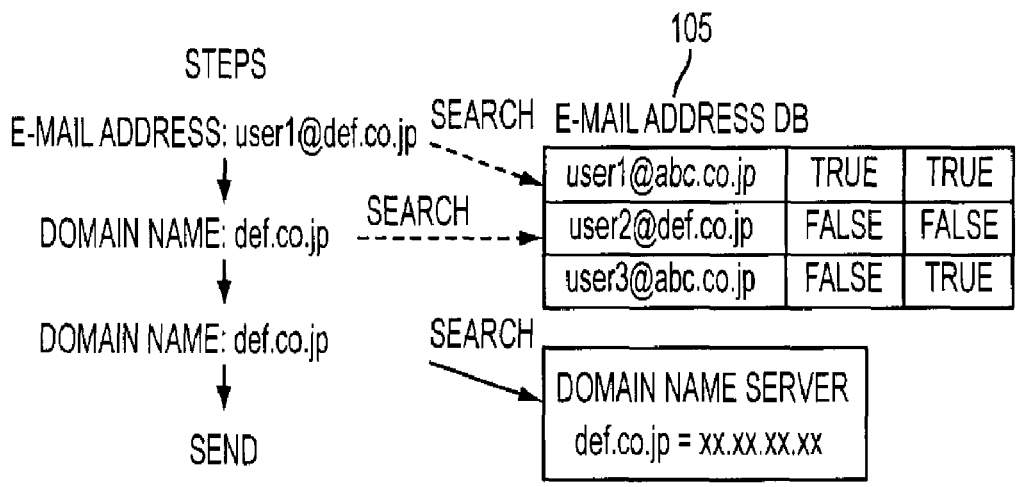
FIG. 9

METHOD AND APPARATUS FOR CONFIRMING BEFORE SENDING AN E-MAIL ATTACHED WITH IMAGE DATA

BACKGROUND OF THE INVENTION

1. Field of the Invention

The present invention relates to an image communication apparatus and in particular to method and apparatus for sending an electronic mail (e-mail) attached with image data.

2. Description of the Related Art

Recently, there have been available facsimile machines that can be connected to the Internet or a local area network (LAN) and have an e-mail sending function to send image data.

For example, Japanese Patent Application Unexamined Publication No. P2000-236413A discloses an Internet facsimile machine that can send e-mail attached with image information to a destination of the e-mail. An operation of this Internet facsimile machine is as follows. First, a user sets a document to be sent on a document reader and then inputs a mail address of a destination. When depressing a start button, the e-mail attached with image data of the document is sent to the destination via the Internet.

However, the above prior art has several disadvantages. First, when the mail address has been erroneously inputted, the e-mail attached with image data is sent to the network, resulting in increased traffic on the network.

Second, if the network is not connected to a mail server, then the e-mail attached with image data roams over the network. Accordingly, the network traffic is further increased and a sender cannot determine whether the mail has reached the destination.

Third, it takes much time for a sender to be informed that sending error has occurred. In the case of the correct domain of the destination mail address but its user name, it is found that the mail address is wrong when the mail has been sent to the mail server. On the other hand, in the case of the wrong domain, the sender realizes the wrong address when the name server has been accessed. Accordingly, the sender is aware of the wrong address after much time has elapsed.

SUMMARY OF THE INVENTION

An object of the present invention is to provide an e-mail sending method and a communication apparatus allowing confirmation of e-mail address before sending.

Another object of the present invention is to provide an e-mail sending method and a communication allowing the load on the network to be reduced.

According to an aspect of the present invention, a communication apparatus having an e-mail function includes: an image reader for reading image data from a document; an input device for inputting a destination e-mail address to which the image data is to be sent; an e-mail address database for retrievably storing a history of sending results for respective destination e-mail addresses; and a controller searching the e-mail address database to find at least one e-mail address that has a domain name identical to that of the destination e-mail address and has a normal sending result and, when the at least one e-mail address is found in the e-mail address database, sending an e-mail attached with the image data to the destination e-mail address.

According to another aspect of the present invention, a method for sending an e-mail to a destination e-mail address, includes the steps of: retrievably storing a history of sending results for respective e-mail addresses in an e-mail address database, wherein each of the sending results includes at least an e-mail sending result; searching the e-mail address database to find at least one e-mail address that has a domain name identical to that of the destination e-mail address and has an email sending result indicating that an e-mail has been successfully sent to the e-mail address; and when the at least one e-mail address is found in the e-mail address database, sending an e-mail attached with the image data to the destination e-mail address.

The method may further include the step of: when no e-mail address having a domain name identical to that of the destination e-mail address is found in the e-mail address database, connecting to a domain name server to determine whether the domain name is allowed to be converted to an IP address in the domain name server, wherein, when the domain name has been converted to the IP address, the e-mail attached with the image data is sent to the destination e-mail address.

The method may further include the steps of: storing a domain sending result for each of the e-mail addresses in the e-mail address database, wherein the domain sending result indicates whether an e-mail has been successfully sent to a domain name server in the domain which the destination e-mail address belongs to; searching the e-mail address database to determine whether at least one e-mail address having a domain sending result indicating that an e-mail has been successfully sent to the domain name server is found; when no e-mail address having a domain sending result indicating that at least one e-mail has been successfully sent to the domain name server is found, connecting to the domain name server to determine whether the domain name is allowed to be converted to an IP address in the domain name server; and when the domain name has been converted to the IP address, sending the e-mail attached with the image data to the destination c-mail address.

According to further another aspect of the present invention, a method for sending an e-mail to a destination e-mail address, includes the steps of: retrievably storing a history of sending results for respective destination e-mail addresses in an e-mail address database, wherein each of the sending results includes at least an e-mail sending result, wherein the e-mail sending result includes an e-mail sending result flag that is set to a true-indicating value when an e-mail has been successfully sent to a corresponding e-mail address and is set to a false-indicating value when the e-mail failed to be sent; searching the e-mail address database to find at least one e-mail address that has a domain name identical to that of the destination e-mail address and has an e-mail sending result flag set to the true-indicating value; and when the at least one e-mail address is found in the e-mail address database, sending an e-mail attached with the image data to the destination e-mail address.

Preferably, the method further includes the steps of: in an operation state of sending no e-mail, when an e-mail address has been input, searching the e-mail address database for the input e-mail address; when no match is found, registering the input e-mail address with an e-mail sending result being set to the false-indicating value.

The method may further include the steps of: storing a domain sending result for each of the e-mail addresses in the e-mail address database, wherein the domain sending result includes a domain sending result flag that is set to the true-indicating value when an e-mail has been successfully sent to a domain name server in the domain which the destination e-mail address belongs to and is set to the false-indicating value when the e-mail failed to be sent to the domain name server; searching the e-mail address database to determine whether at least one e-mail address having a domain sending result flag is set to the true-indicating value; when no e-mail address having the domain sending result flag set to the true-indicating value, connecting to the domain name server to determine whether the domain is allowed to be converted to an IP address in the name server; and when the domain name has been converted to the IP address, sending the e-mail attached with the image data at the destination e-mail address.

Preferably, the method further includes the steps of: in an operation state of sending no e-mail, when an e-mail address has been input, searching the e-mail address database for an e-mail address identical to the input e-mail address and at least one e-mail address having the same domain name of the input e-mail address; when neither e-mail address identical to the input e-mail address nor e-mail address having the same domain name of the input e-mail address is found, both the e-mail sending result flag and the domain sending result flag are set to the false-indicating value to be registered in the e-mail address database; and when no e-mail address identical to the input e-mail address is found but an e-mail address having the same domain name of the input e-mail address, the mail sending result flag is set to the false-indicating value and the domain sending result flag is set to a domain sending result flag corresponding to the found e-mail address.

As described above, sending history management is performed using the e-mail address database. It is determined, before sending, whether the sending of an e-mail was successfully terminated and, if it is found in the e-mail address database that the sending failed, then it is further determined whether the domain name of the destination e-mail address is found in the e-mail address database. When such a domain name is found, the e-mail is sent to the input e-mail address.

Accordingly, even when the e-mail address has been erroneously-input, the e-mail attached with image data does not roam over the network, resulting in decreased traffic on the network.

An e-mail can be sent in the same manner even in the case where a firewall is provided between the LAN and the Internet. The facsimile machine 100 performs only sending to the e-mail server 120 because the domain name server 110 is connected to the LAN allowing domain name resolution.

Further, by adding a new e-mail address to the e-mail address database 105, when a registered e-mail address that has never been sent is searched as a destination address for the first time, the domain sending result thereof is checked before sending. Accordingly, input mistakes can be effectively avoided and the load on the network due to wrong e-mail addresses can be reduced.

BRIEF DESCRIPTION OF THE DRAWINGS

FIG. 7 is a diagram showing an example of a mail address database;

FIG. 8 is a diagram showing a first example of a mail address searching operation;

FIG. 9 is a diagram showing a second example of a mail address searching operation;

DESCRIPTION OF THE PREFERRED EMBODIMENTS

Facsimile Machine

Figure 1:
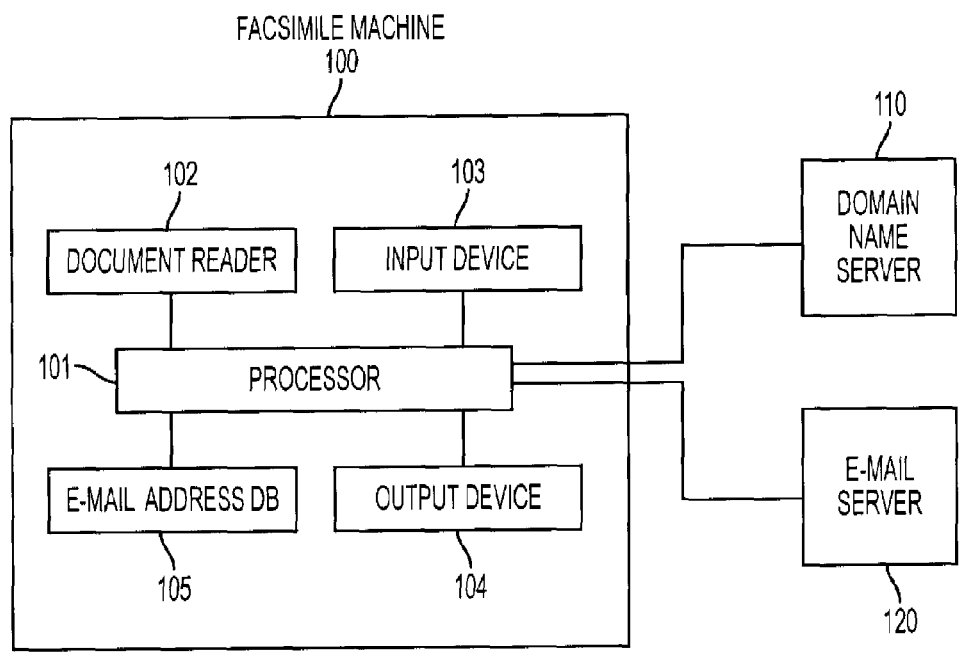
FIG. 1 is a block diagram showing a facsimile machine according to an embodiment of the present invention.

Referring to FIG. 1, a facsimile machine 100 according to an embodiment of the present invention is provided with a processor 101 which is a program-controlled processor having a network communication function. The processor 101 controls a document reader 102, an input device 103, an output device 104, and a mail address database 105 to perform an e-mail sending operation, which will be described later. The document reader 102 is used to read a document to be attached to an e-mail. A user can input a mail address with the input device 103. When a send error occurs, the user is notified by the output device 104 outputting an error message.

The mail address database 105 stores a history of sending results, which is used for communication management within the facsimile machine 100. An example of the mail address database 105 is shown in FIG. 7.

Mail Address Database

In FIG. 7, the mail address database 105 contains a table having a mail address field 701, a mail sending result flag field 702, and a domain sending result flay field 703. Mail addresses inputted by a user using the input device 103 are sequentially stored in the mail address field 701, and the mail sending result and domain sending result corresponding to each mail address are stored in the mail sending result flag field 702 and the domain sending result flag field 703, respectively.

The mail sending result flag indicates whether the mail has been successfully sent to its destination mail address. When the mail has been successfully sent to its destination mail address, the mail sending result flag is set to "TRUE". When the mail cannot be sent due to occurrence of a sending error, the mail sending result flag is set to "FALSE".

The domain sending result flag indicates whether the mail has been successfully sent to the mail server of the domain which the mail address belongs to. When the mail has been sent to the mail server and then successfully sent to its destination mail address or when an sending error occurs but the error contents includes no user account, the domain sending result flag is set to "TRUE". When other sending errors occur or when a physical error occurs such that the mail cannot be sent to the mail server, the domain sending result flag is set to "FALSE".

Network System

Figure 2:
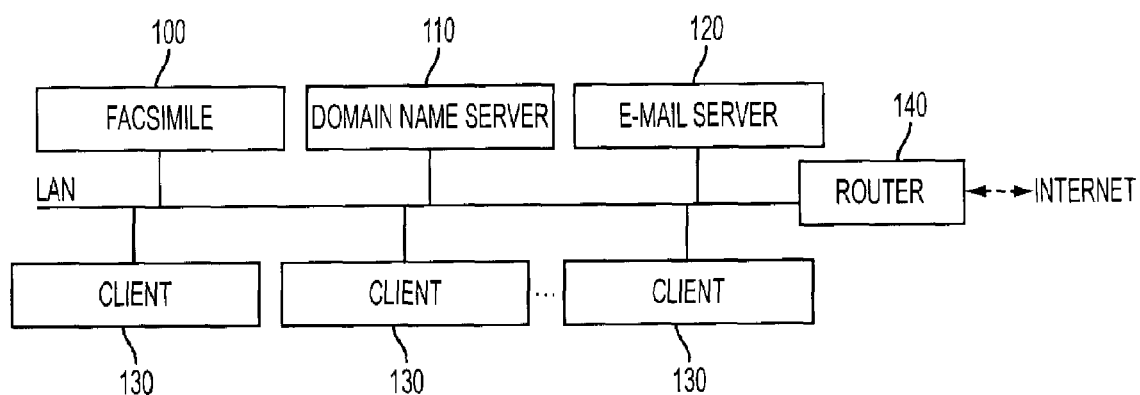
FIG. 2 is a block diagram showing a network system employing the facsimile machine according to the embodiment of the present invention.

Referring to FIG. 2, the facsimile machine 100, a name server 110, a mail server 120, and a plurality of clients 130 are connected to a LAN, which can be connected to the Internet through a router 140. As well known, the mail server 120 receives and sends e-mails and the name server 110 converts the domain of an e-mail to an IP address to forward it to the mail server 120. Each client 130 can access the mail server 120 to receive e-mails addressed to the client.

Even in the case where a firewall is provided between the LAN and the Internet, the facsimile machine 100 performs only sending to the mail server 120 because the name server 110 is connected to the LAN allowing domain resolution. This allows e-mails to be sent in the same manner.

Operations

1) Outline of E-mail Sending Operation

Figure 3:
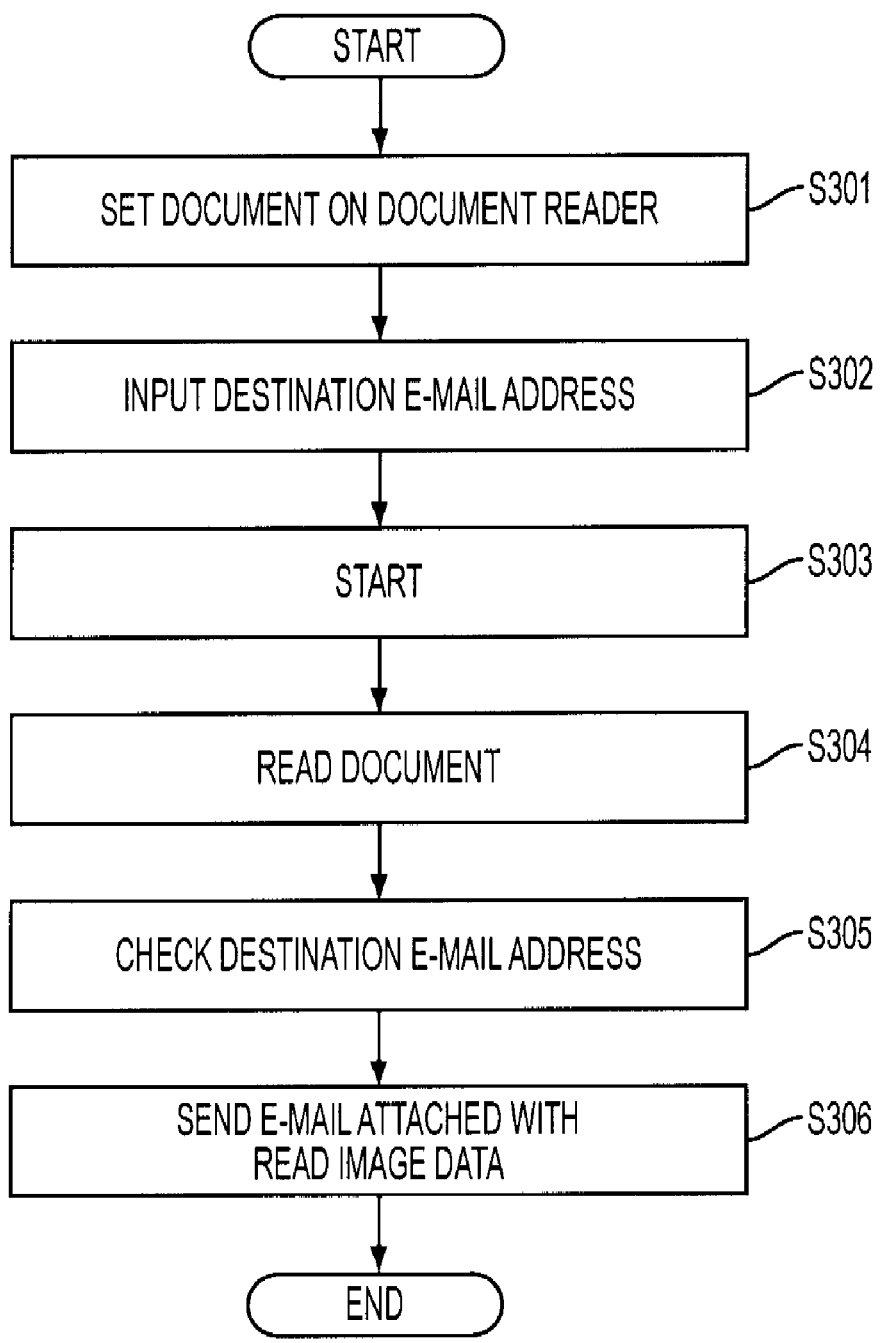
FIG. 3 is a flow chart showing an e-mail sending procedure according to the embodiment.

Referring to FIG. 3, a document is set on the document reader 102 (step S301) and a destination mail address is inputted with the input device 103 (step S302). When a start button is depressed (step S303), the document reader 102 starts reading the document to convert its image to image data that is readable for the processor 101 (step S304). Thereafter, a destination mail address check routine (step S305) is performed by referring to the mail address database 105, which will be described in detail later. When the mail address check has been successfully terminated, a mail header is created and attached with the image data and then the e-mail attached with the image data is sent to the destination mail address via the LAN and/or the Internet (step S306).

1.1) Address Check

Details of the destination mail address check routine will be described hereinafter.

Figure 4:
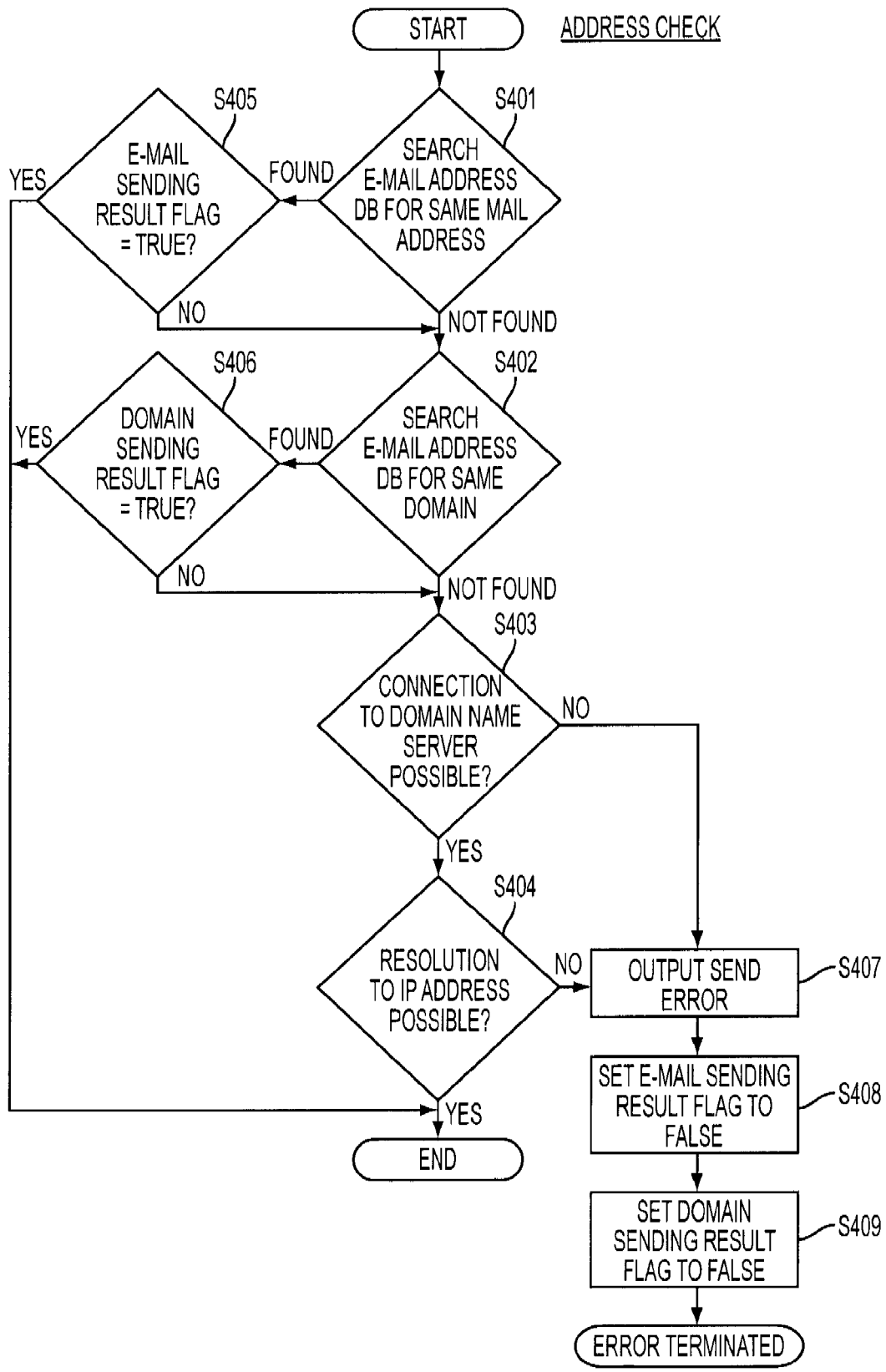
FIG. 4 is a flow chart showing an address check control operation in the e-mail sending procedure according to the embodiment.

Referring to FIG. 4, when the destination mail address has been inputted through the input device 103, the processor 101 searches the mail address database 105 for the same mail address as the inputted destination mail address (step S401). More specifically, the mail address field 701 of the mail address database 105 is searched to find the same address as the inputted destination mail address (see FIG. 7).

When a match is found, it is determined whether the mail sending result flag corresponding to the found mail address is "TRUE" (step S405). When the corresponding mail sending result flag is "TRUE" (YES in step S405), that is, at least one mail has been sent with success, the address check routine is normally terminated.

When the corresponding mail sending result flag is "FALSE" (NO in step S405), that is, all mails failed to be sent in the past, the processor 101 searches the mail address database 105 for the same domain as that of the inputted destination mail address (step S402). More specifically, the mail address field 701 of the mail address database 10*b* is searched to find the same domain as the inputted destination mail address (see FIG. 7). When no match is found (NO in step S401), the step S402 is also performed.

When the same domain as the inputted destination mail address is found in the mail address database 105, it is determined whether a corresponding domain sending result flag is "TRUE" (step S406). When the corresponding domain sending result flag is "TRUE" (YES in step S406), that is, at least one mail has been sent to the mail server of that domain with success, the address check routine is normally terminated.

On the other hand, when the corresponding domain sending result flag is "FALSE" (NO in step S405), that is, all mails failed to be sent to the mail server of that domain in the past, or when no match is found (NO in step S402), it is determined whether connection to the name server 110 is possible (step S403).

When the connection to the name server 110 is possible (YES in step S403), it is further determined whether resolution from the domain t an IP address is possible (step S404). When the resolution to IP address is possible (YES in step S404), the address check routine is normally terminated.

When the connection to the name server 110 is not made, that is, when some failure occurs in the network (NO in step S403), a sending error message is output through the output device 104 (step S407). When the resolution from the domain t an IP address is not possible (NO in step S404), that is, the mail server fails to be identified, a sending error message is also output through the output device 104 (step S407). After the step S407, the processor 101 instructs the mail address database 105 to set both the mail sending result flag and domain sending result flag corresponding to the mail address to "FALSE" (steps S408 and S409).

1.2) Mail Sending

Details of the mail sending routine will be described hereinafter.

Figure 5:
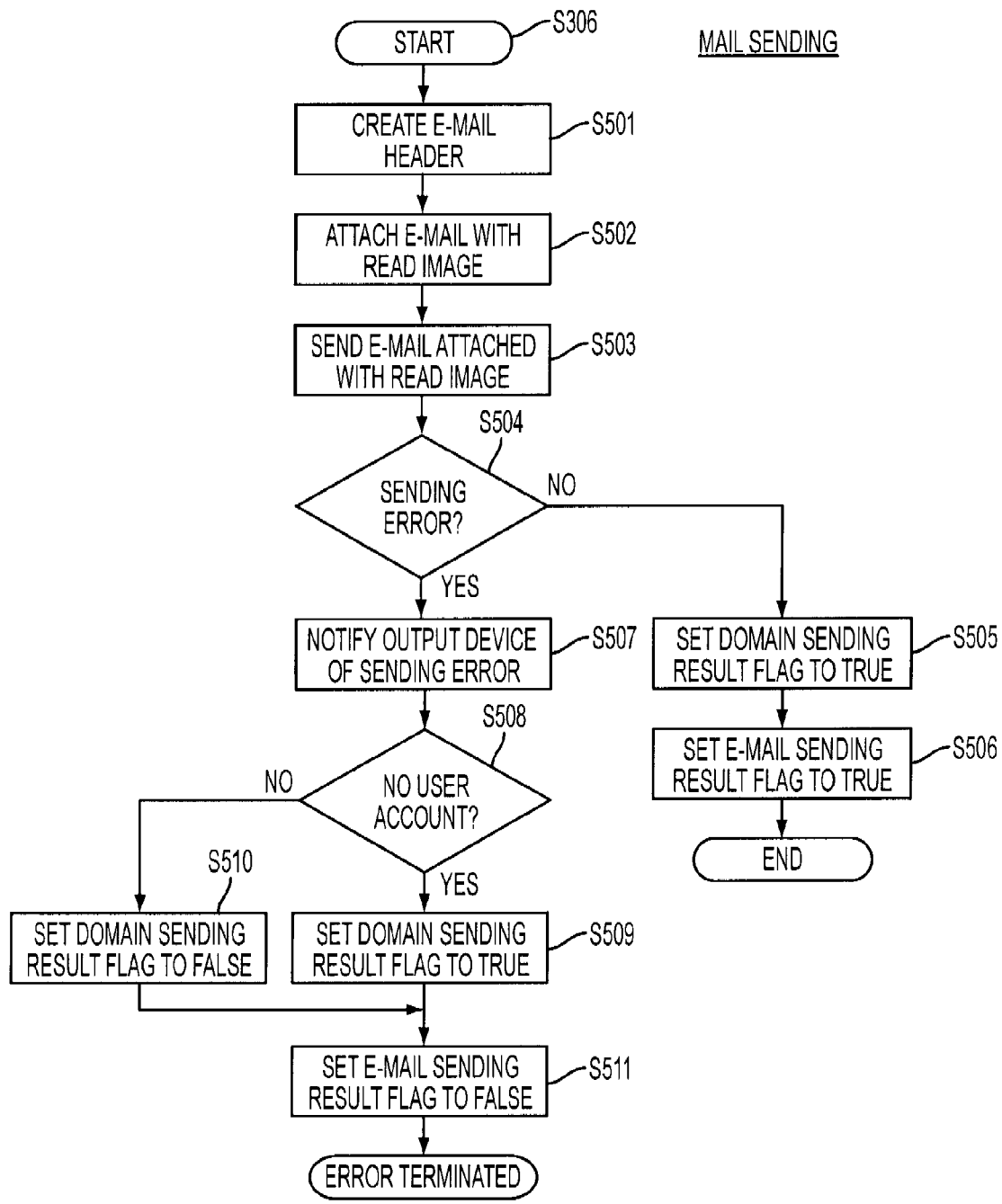
FIG. 5 is a flow chart showing a mail sending control operation in the e-mail sending procedure according to the embodiment.

Referring to FIG. 5, the processor 101 creates a mail header (step S501). Based on the mail header, the processor 101 creates an e-mail attached with the image data that was read at the step 304 of FIG. 3 (step S502), and sends it to the destination (step S503).

When no sending error occurs (NO in step S504), the processor 101 sets both the mail sending result flag and the domain sending result flag to "TRUE" (steps S505 and S506) before terminating this routine.

When a sending error occurs (YES in step S504), the processor 101 notifies the output device of the sending error (step S507). Thereafter, the processor 101 analyzes the sending error to determine whether the user has been registered in the name server of the domain (step S508). If the user has not been registered (YES in step S508), that is, the e-mail has reached the mail server but the destination mail address does not exist in the mail server, then the domain sending result flag is changed to "TRUE" (step S509). If other errors occur, for example, the mail server rejects the acceptance of the mail or the e-mail cannot reach the mail server, then the domain sending result flag is changed to "FALSE" (step S510). Thereafter, the mail sending result flag is changed to "FALSE" (step S511) and the routine is terminated with error.

2) Mail Address Searching 2.1) Case 1

As shown in FIG. 8, it is assumed that the mail address database 105 contains three mail addresses and a destination mail address "user2@abc.co.jp" is inputted with the input device 103. In this case, the mail address database 105 is searched for the inputted mail address "user2@abc.co.jp" and no match is found (see the step S401 of FIG. 4). Accordingly, the mail address database 105 is further searched for the domain "abc.co.jp" (see the step S402 of FIG. 4). Since the domain "abc.co.jp" is found, it is checked whether the domain sending result flag corresponding to the domain "abc.co.jp" is "TRUE" (see the step S406 of FIG. 4). Since the domain sending result flag is "TRUE," the e-mail is sent to the destination.

2.2) Case 2

As shown in FIG. 9, it is assumed that the mail address database 105 contains three mail addresses and a destination mail address "user1@def.co.jp" is inputted with the input device 103. In this case, the mail address database 105 is searched for the inputted mail address "user1@def.co.jp"

and no match is found (see the step S401 of FIG. 4). Accordingly, the mail address database 105 is further searched for the domain "def.co.jp" (see the step S402 of FIG. 4). Since the domain "def.co.jp" is found, it is checked whether the domain sending result flag corresponding to the domain "def.co.jp" is "TRUE" (see the step S406 of FIG. 4). Since the domain sending result flag is "FALSE," it is further checked whether the connection to the name server 110 is possible (see the step S403 of FIG. 4). If the connection is possible, the name server 110 tries to resolve the domain "def.co.jp" to an IP address. When the domain "def.co.jp" can be converted to an IP address "xx.xx.xx.xx" in the name server 110, the e-mail is sent to the destination.

2.3) Case 3

Figure 10:
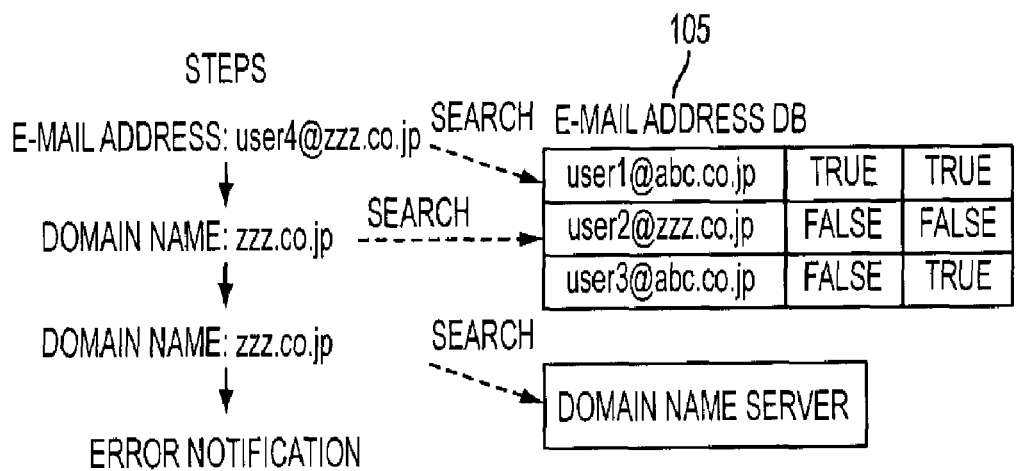
FIG. 10 is a diagram showing a third example of a mail address searching operation.

As shown in FIG. 10, it is assumed that the mail address database 105 contains three mail addresses and a destination mail address "user4@zzz.co.jp" is inputted with the input device 103. In this case, the mail address database 105 is searched for the inputted mail address "user4@zzz.co.jp" and no match is found (see the step S401 of FIG. 4). Accordingly, the mail address database 105 is further searched for the domain "zzz.co.jp" (see the step S402 of FIG. 4). Since the domain "zzz.co.jp" is found, it is checked whether the domain sending result flag corresponding to the domain "zzz.co.jp" is "TRUE" (see the step S406 of FIG. 4). Since the domain sending result flag is "FALSE," it is further checked whether the connection to the name server 110 is possible (see the step S403 of FIG. 4). If the connection is possible, the name server 110 tries to resolve the domain "zzz.co.jp" to an IP address. If the domain "zzz.co.jp" cannot be converted to an IP address in the name server 110, the output device 103 is notified of error (see the step S407 of FIG. 4).

Advantages

As described above, the sending history management is performed using the mail address database 105. It is determined whether the sending of an e-mail is possible, before sending and, if the sending results failed in the mail address database, then it is further determined whether the domain of the destination mail address is found in the mail address database. When such domain is found, the e-mail is sent.

Accordingly, even when the mail address has been erroneously inputted, the e-mail attached with image data does not roam over the network, resulting in decreased traffic on the network.

An e-mail can be sent in the same manner even in the case where a firewall is provided between the LAN and the Internet. The facsimile machine 100 performs only sending to the mail server 120 because the name server 110 is connected to the LAN allowing domain resolution.

Address Registration

Figure 6:
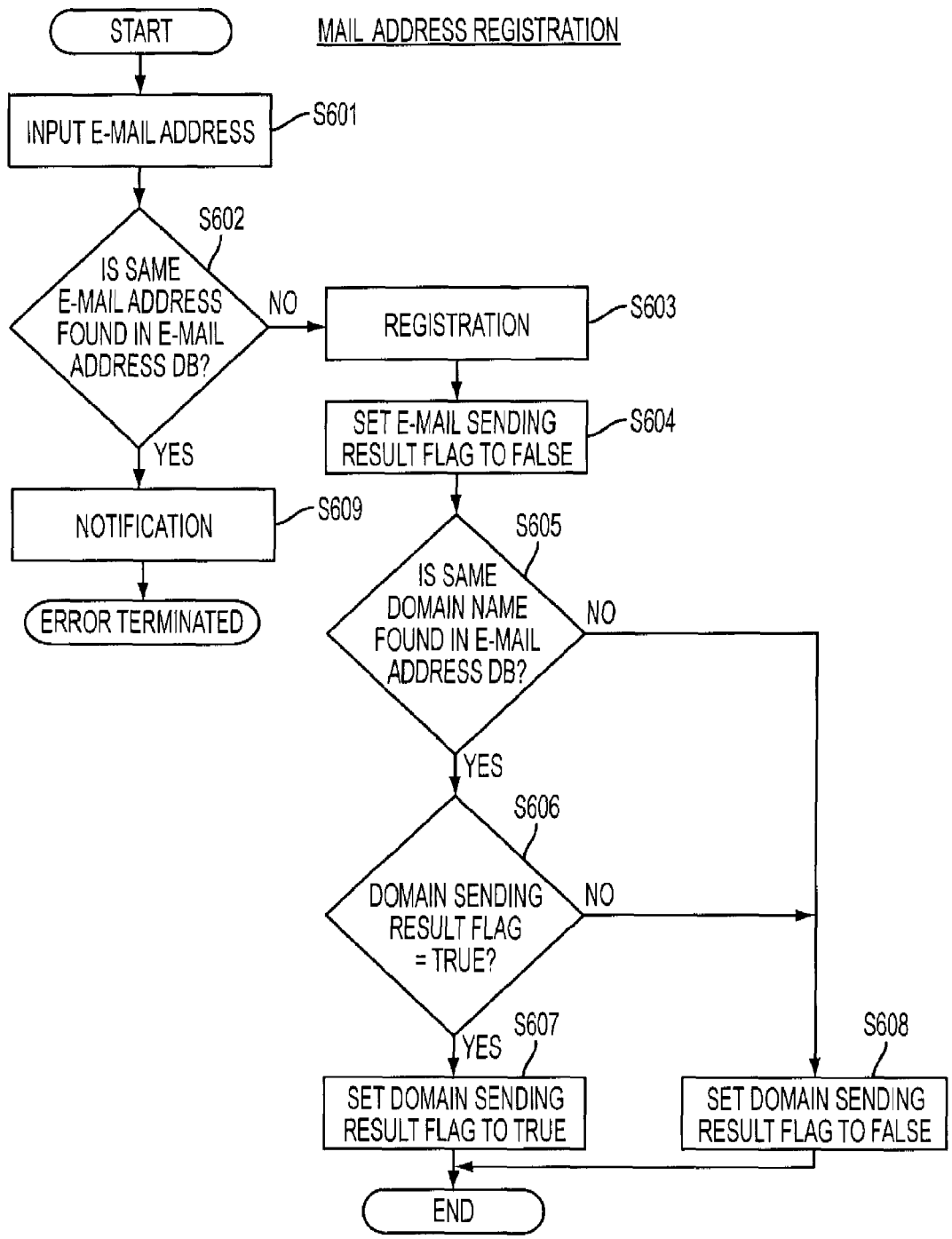
FIG. 6 is a flow chart showing a mail address registration operation according to the embodiment.

Hereinafter, mail address registration into the mail address database 105 will be described. As described before, the mail address database 105 stores a history of results of sending mail addresses that were inputted with the input device 103. In addition, a new mail address can be added to the mail address database 105, Referring to FIG. 6, when a mail address is inputted with the input device 103 (step S601), the processor 101 searches the mail address database 105 for the same mail address as the inputted mail address (step S602). When the same mail address is found (YES in step S602), the processor 101 instructs the output device 104 to notify the user that the inputted mail address has been already registered (step S609) and terminates this routine with error. When the same mail address is not found (NO in step S602), the processor 101 registers the inputted mail address in the mail address database 105 (step S603). In this step of registering the new mail address, no mail is sent. Accordingly, the mail sending result flag corresponding to the new mail address is set to "FALSE" (step S604).

Subsequently, the processor 101 searches the mail address database 105 for the same domain as that of the new mail address (step S605). When no match is found (NO in step S605), the domain sending result flag corresponding to the new mail address is set to "FALSE" (step S608) and this routine is terminated.

When the same domain as that of the new mail address is found (YES in step S605), it is determined whether a corresponding domain sending result flag is "TRUE" (step S606). When the corresponding domain sending result flag is "TRUE" (YES in step S606), which means that at least one mail has been sent to the name server in the same domain, the domain sending result flag corresponding to the new mail address is set to "TRUE" (step S607) and this routine is terminated. When the corresponding domain sending result flag is "FALSE" (NO in step S606), the domain sending result flag corresponding to the new mail address is set to "FALSE" (step S608) and this routine is terminated.

Figure 11:
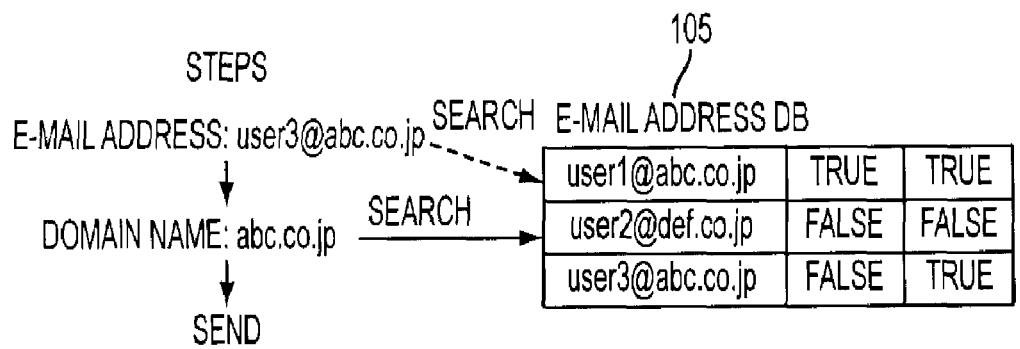
FIG. 11 is a diagram showing a fourth example of a mail address searching operation.

FIG. 11 shows a flow of searching the mail address database 105 when inputting a mail address that is the same as a registered mail address that has never been sent and has a different account and a domain in which another mail has been sent without error.

As shown in FIG. 11, it is assumed that the mail address database 105 contains three registered mail addresses and a destination mail address "user3@abc.co.jp" is inputted with the input device 103. In this case, the mail address database 105 is searched for the inputted mail address "user3@abc.co.jp" and a match is found (see the step S401 of FIG. 4). Accordingly, it is further determined whether the mail sending result flag corresponding to the inputted mail address "user3@abc.co.jp" is "TRUE" (see the step S405 of FIG. 4). Since it is "FALSE", the mail address database 105 is further searched for the domain "abc.co.jp" (see the step S402 of FIG. 4). Since the domain "abc.co.jp" is found, it is checked whether the domain sending result flag corresponding to the domain "abc.co.jp" is "TRUE" (see the step S406 of FIG. 4). Since the domain sending result flag is "TRUE," the e-mail is sent to the destination.

By adding a new mail address to the mail address database 105, when a registered mail address that has never been sent is searched as a destination address for the first time, the domain sending result thereof is checked before sending. Accordingly, input mistakes can be effectively avoided and the load on the network due to wrong mail addresses can be reduced.

The invention claimed is:

1. A communication apparatus having an e-mail function, comprising:
  an image reader for reading image data from a document;
  an input device for inputting a destination e-mail address to which the image data is to be sent;
  an e-mail address database retrievably storing a history of sending results for respective destination e-mail addresses; and
  a controller searching the e-mail address database to find at least one e-mail address that has a domain name identical to that of the destination e-mail address and has a normal sending result and, when the at least one e-mail address is found in the e-mail address database, sending an e-mail attached with the image data to the destination e-mail address.

2. The communication apparatus according to claim 1 being a facsimile machine.

3. A method for sending an e-mail to a destination e-mail address, comprising the steps of:
retrievably storing a history of sending results for respective destination e-mail addresses in an e-mail address database, wherein each of the sending results includes at least an e-mail sending result;
searching the e-mail address database to find at least one e-mail address that has a domain name identical to that of the destination e-mail address and has an email sending result indicating that an e-mail has been successfully sent to the e-mail address; and
when the at least one e-mail address is found in the e-mail address database, sending an e-mail attached with the image data to the destination e-mail address.

4. The method according to claim 3, further comprising the step of:
when no e-mail address having a domain name identical to that of the destination e-mail address is found in the e-mail address database, connecting to a domain name server to determine whether the domain name is allowed to be converted to an IP address in the domain name server,
wherein, when the domain name has been converted to the IP address, the e-mail attached with the image data is sent to the destination e-mail address.

5. The method according to claim 3, further comprising the steps of:
storing a domain sending result for each of the e-mail addresses in the e-mail address database, wherein the domain sending result indicates whether an e-mail has been successfully sent to a domain name server in the domain which the destination e-mail address belongs to;
searching the e-mail address database to determine whether at least one e-mail address having a domain sending result indicating that an e-mail has been successfully sent to the domain name server is found;
when no e-mail address having a domain sending result indicating that at least one e-mail has been successfully sent to the domain name server is found, connecting to the domain name server to determine whether the domain name is allowed to be converted to an IP address in the domain name server; and
when the domain name has been converted to the IP address, sending the e-mail attached with the image data to the destination e-mail address.

6. A method for sending an e-mail to a destination e-mail address, comprising the steps of:
retrievably storing a history of sending results for respective destination e-mail addresses in an e-mail address database, wherein each of the sending results includes at least an e-mail sending result, wherein the e-mail sending result includes an e-mail sending result flag that is set to a true-indicating value when an e-mail has been successfully sent to a corresponding e-mail address and is set to a false-indicating value when the e-mail failed to be sent;
searching the e-mail address database to find at least one e-mail address that has a domain name identical to that of the destination e-mail address and has an e-mail sending result flag set to the true-indicating value; and
when the at least one e-mail address is found in the e-mail address database, sending an e-mail attached with the image data to the destination e-mail address.

7. The method according to claim 6, further comprising the steps of:
in an operation state of sending no e-mail,
when an e-mail address has been input, searching the e-mail address database for the input e-mail address; and
when no match is found, registering the input e-mail address with an e-mail sending result being set to the false-indicating value.

8. The method according to claim 6, further comprising the steps of:
storing a domain sending result for each of the e-mail addresses in the e-mail address database, wherein the domain sending result includes a domain sending result flag that is set to the true-indicating value when an e-mail has been successfully sent to a domain name server in the domain which the destination e-mail address belongs to and is set to the false-indicating value when the e-mail failed to be sent to the domain name server;
searching the e-mail address database to determine whether at least one e-mail address having a domain sending result flag is set to the true-indicating value;
when no e-mail address having the domain sending result flag set to the true-indicating value is found, connecting to the domain name server to determine whether the domain name is allowed to be converted to an IP address in the name server; and
when the domain name has been convened to the IP address, sending the e-mail attached with the image data to the destination e-mail address.

9. The method according to claim 8, further comprising the steps of:
in an operation state of sending no e-mail,
when an e-mail address has been input, searching the e-mail address database for an e-mail address identical to the input e-mail address and at least one e-mail address having the same domain name of the input e-mail address;
when neither an e-mail address identical to the input e-mail address nor an e-mail address having the same domain name of the input e-mail address is found, both the e-mail sending result flag and the domain sending result flag are set to the false-indicating value to be registered in the e-mail address database; and
when no e-mail address identical to the input e-mail address is found but an e-mail address having the same domain name of the input e-mail address is found, the mail sending result flag is set to the false-indicating value and the domain sending result flag is set to a domain sending result flag corresponding to the found e-mail address.

10. A communication apparatus having an e-mail function, comprising:
an image reader for reading image data from a document;
an input device for inputting a destination e-mail address to which the image data is to be sent;
an e-mail address database retrievably storing a history of an e-mail sending result and a domain sending result for respective destination e-mail addresses, wherein the e-mail sending result indicates whether an e-mail addressed to a corresponding destination e-mail address has been successfully sent and the domain sending result indicates whether an e-mail addressed to a corresponding destination e-mail address has been successfully sent to a domain name server of a domain which the corresponding destination e-mail address belongs to; and a controller searching the e-mail address database to find at least one e-mail address that has a domain name identical to that of the destination e-mail address and has an e-mail sending result indicating that an e-mail has been successfully sent and, when the at least one e-mail address is found in the e-mail address database, sending an e-mail attached with the image data to the destination e-mail address.

11. The communication apparatus according to claim 10, wherein the controller performs connection to a domain name server to determine whether the domain name is allowed to be converted to an IP address in the domain name server when no e-mail address having the domain name identical to that of the destination e-mail address is found in the e-mail address database, wherein, when the domain name has been converted to the IP address, the e-mail attached with the image data is sent to the destination e-mail address.

12. The communication apparatus according to claim 10, wherein the controller searches the e-mail address database to determine whether at least one e-mail address has a domain sending result indicating that an e-mail has been successfully sent to the domain name server, and when no e-mail address having a domain sending result indicating that an e-mail has been successfully sent to the domain name server is found, the controller performs connection to the domain name server to determine whether the domain name is allowed to be converted to an IP address in the name server, wherein, when the domain name has been converted to the IP address, the controller sends the e-mail attached with the image data to the destination e-mail address.

13. The communication apparatus according to claim 10, wherein the controller searches the e-mail address database for a destination e-mail address that is input in a not-sending operation state, and when no match is found, the controller registers the input e-mail address with an e-mail sending result being set to a false-indicating value that indicates that an e-mail addressed to the input e-mail address failed to be sent.

14. The communication apparatus according to claim 10, wherein the controller searches the e-mail address database for an e-mail address identical to the destination e-mail address that is input in a not-sending operation state and at least one e-mail address having the same domain name of the input e-mail address; and when neither the e-mail address identical to the input e-mail address nor the at least one e-mail address having the same domain name of the input e-mail address is found, the controller sets both the e-mail sending result flag and the domain sending result flag to the false-indicating value and registers them in the e-mail address database; and when no e-mail address identical to the input e-mail address is found but at least one e-mail address having the same domain name of the input e-mail address is found, the controller sets the e-mail sending result flag to the false-indicating value and the domain sending result flag to a domain sending result flag corresponding to the found e-mail address, and registers them in the e-mail address database.

15. The communication apparatus according to claim 10 being a facsimile machine.

* * * * *